US012609943B2

(12) United States Patent
Kanemoto

(10) Patent No.: US 12,609,943 B2
(45) Date of Patent: Apr. 21, 2026

(54) APPLICATION ATTACK DETERMINATION DEVICE, APPLICATION ATTACK DETERMINATION METHOD, AND APPLICATION ATTACK DETERMINATION PROGRAM

(71) Applicant: NTT, Inc.

(72) Inventor: Yo Kanemoto, Tokyo (JP)

(73) Assignee: NTT, Inc., Tokyo (JP)

( * ) Notice: Subject to any disclaimer, the term of this patent is extended or adjusted under 35 U.S.C. 154(b) by 163 days.

(21) Appl. No.: 18/554,769

(22) PCT Filed: Apr. 16, 2021

(86) PCT No.: PCT/JP2021/015718
§ 371 (c)(1),
(2) Date: Oct. 10, 2023

(87) PCT Pub. No.: WO2022/219806
PCT Pub. Date: Oct. 20, 2022

(65) Prior Publication Data
US 2024/0187429 A1 Jun. 6, 2024

(51) Int. Cl.
*H04L 9/40* (2022.01)
(52) U.S. Cl.
CPC ...... *H04L 63/1416* (2013.01); *H04L 63/1425* (2013.01); *H04L 63/1466* (2013.01)
(58) Field of Classification Search
CPC ............. H04L 63/1416; H04L 63/1425; H04L 63/1466
See application file for complete search history.

(56) References Cited

U.S. PATENT DOCUMENTS

| | | | | |
|---|---|---|---|---|
| 10,628,764 | B1 * | 4/2020 | Kaplan | .......... G06Q 10/063112 |
| 2009/0049547 | A1 * | 2/2009 | Fan | ..................... H04L 63/1425 726/22 |
| 2012/0284237 | A1 * | 11/2012 | Li | ..................... G06F 16/24526 707/E17.014 |
| 2017/0063793 | A1 * | 3/2017 | Galbreath | .......... H04L 63/0254 |

(Continued)

FOREIGN PATENT DOCUMENTS

| | | |
|---|---|---|
| JP | 2019533841 A | 11/2019 |
| JP | 6708794 B2 | 6/2020 |

OTHER PUBLICATIONS

Uehara, Takayuki (1999) "Operation management and log monitoring are indispensable for Internet safety measures that go one step further" Nikkei Communications, Mar. 15, 1999, No. 290, pp. 216-221, ISSN 0910-7215, in particular, pp. 218-220, p. 220, pictures 3-5, in particular, pp. 218-220, p. 220, pictures 3-5.

(Continued)

*Primary Examiner* — Hieu T Hoang

(57) ABSTRACT

A determination device includes processing circuitry configured to detect a communication log of an attack causing different damage in accordance with a function of a web application of a request destination using a URL of the request destination in a communication log in which an attack is to be detected, determine whether or not the attack has succeeded using whether or not there is a login form in the URL of the request destination, a response size to a request, or a status code, or any combination thereof, for the communication log in which the attack has been detected, and output a result of the determination.

7 Claims, 9 Drawing Sheets

(1) ATTACK REQUEST
GET /login.php?id=admin&pw=1' OR 1=1 ~101
GET /show.php?id=admin&pw=1' OR 1=1 ~102

WEB SERVER

INTERNET (2)
STATUS CODE : 302
RESPONSE SIZE: 10000

~10
DETERMINATION DEVICE (3)
SPECIFY AS AUTHENTICATION BYPASS ATTACK
AND DETERMINE THAT ATTACK HAS SUCCEEDED FROM STATUS CODE
SPECIFY AS INFORMATION LEAKAGE ATTACK
AND DETERMINE THAT ATTACK HAS SUCCEEDED FROM RESPONSE SIZE

(56) References Cited

U.S. PATENT DOCUMENTS

| | | | |
|---|---|---|---|
| 2017/0126627 A1* | 5/2017 | Yang | H04L 63/20 |
| 2017/0308688 A1* | 10/2017 | Orihara | G06F 21/55 |
| 2019/0370476 A1* | 12/2019 | Zhong | G06F 16/00 |
| 2019/0394233 A1* | 12/2019 | Li | H04L 63/1416 |
| 2020/0201987 A1 | 6/2020 | Kanemoto | |
| 2021/0226967 A1* | 7/2021 | Shin | H04L 63/02 |

OTHER PUBLICATIONS

Gu, Haifeng et al. (2019) "DIAVA: A Traffic-Based Framework for Detection of SQL Injection Attacks and Vulnerability Analysis of Leaked Data" IEEE Transactions on Reliability., Jul. 24, 2019, vol. 69, No. 1, pp. 188-202, [online], [retrieved on May 25, 2021], Retrieved from the Internet: <URL: https://ieeexplore.ieee.org/document/8771368>, <doi: 10.1109/TR.2019.2925415>, ISSN 0018-9529, in particular, p. 19, A. Network Traffic Collection of SQL Injection Attacks.

* cited by examiner

Fig. 1

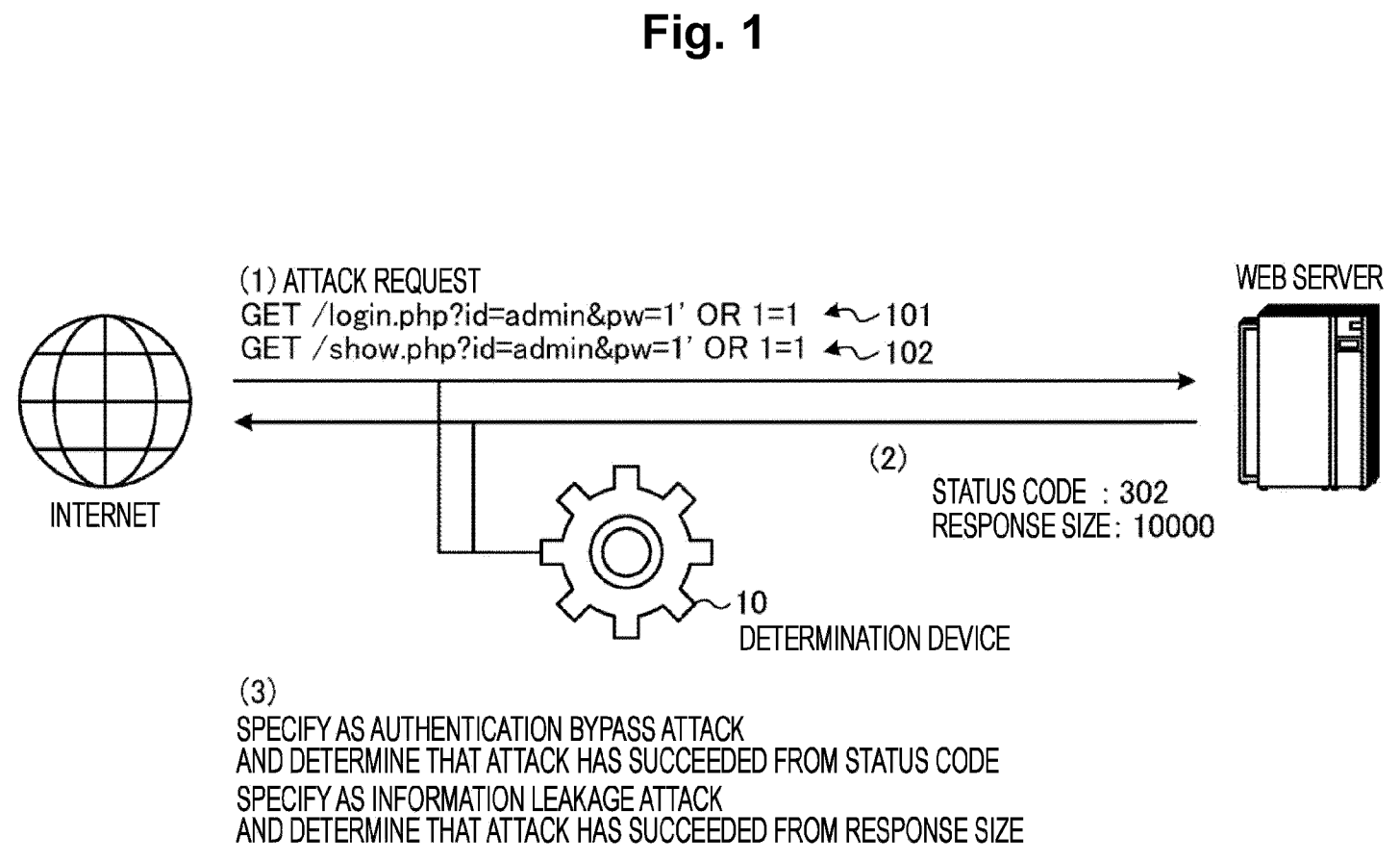

WEB SERVER (1) ATTACK REQUEST
GET /login.php?id=admin&pw=1' OR 1=1    ~101
GET /show.php?id=admin&pw=1' OR 1=1    ~102

(2)    STATUS CODE : 302
RESPONSE SIZE : 10000

10
DETERMINATION DEVICE (3)
SPECIFY AS AUTHENTICATION BYPASS ATTACK
AND DETERMINE THAT ATTACK HAS SUCCEEDED FROM STATUS CODE
SPECIFY AS INFORMATION LEAKAGE ATTACK
AND DETERMINE THAT ATTACK HAS SUCCEEDED FROM RESPONSE SIZE

INTERNET

Fig. 3

FIRST COMMUNICATION LOG

| No. | URL | STATUS CODE | RESPONSE SIZE | CONTENT OF RESPONSE |
|-----|-----|-------------|---------------|---------------------|
| 1 | /login.php | 200 | 100 | ...<br>〈form〉<br>〈input type=text ···〉<br>〈input type=password ···〉<br>... |
| 2 | /show.php?id=alice&pw=alice | 200 | 100 | |
| 3 | /login.php?id=admin&pw=test | 302 | 100 | |
| 4 | /login.php?id=admin&pw=1' OR 1=1 # | 302 | 100 | |
| 5 | /login.php?name=1' OR 1=1 # | 200 | 100 | |
| 6 | /show.php?id=admin&pw=1' OR 1=1 # | 200 | 10000 | |

FUNCTION PROFILE

| PROFILE ID | WHETHER OR NOT THERE IS LOGIN FORM | RESPONSE SIZE RANGE | RELATED REQUEST No |
|------------|-------------------------------------|---------------------|--------------------|
| /login.php | YES | [0, 100] | [1, 3] |
| /show.php | NO | [0, 100] | [2] |

Fig. 4

| No. | ATTACK DETECTION | URL |
|---|---|---|
| 1 | | /login.php |
| 2 | | /show.php?id=alice&pw=alice |
| 3 | | /login.php?id=admin&pw=test |
| 4 | ATTACK | /login.php?id=admin&pw=1' OR 1=1 # |
| 5 | ATTACK | /login.php?name=1' OR 1=1 # |
| 6 | ATTACK | /show.php?id=admin&pw=1' OR 1=1 # |

DETECTION DATA ←

Fig. 5

| No. | ATTACK DETECTION | URL | STATUS CODE | RESPONSE SIZE | WHETHER OR NOT THERE IS LOGIN FORM | RESPONSE SIZE RANGE | SUCCESS/FAILURE DETERMI-NATION |
|---|---|---|---|---|---|---|---|
| 4 | ATTACK | /login.php?id=admin&pw=1' OR 1=1 # | 302 | 100 | YES | [0, 100] | SUCCESS |
| 5 | ATTACK | /login.php?name=1' OR 1=1 # | 200 | 100 | YES | [0, 100] | FAILURE |
| 6 | ATTACK | /show.php?id=admin&pw=1' OR 1=1 # | 200 | 10000 | | [0, 100] | SUCCESS |

APPLICATION ATTACK DETERMINATION DEVICE, APPLICATION ATTACK DETERMINATION METHOD, AND APPLICATION ATTACK DETERMINATION PROGRAM

CROSS-REFERENCE TO RELATED APPLICATIONS

This application is a U.S. 371 Application of International Patent Application No. PCT/JP2021/015718, filed on 16 Apr. 2021, the disclosure of which is hereby incorporated herein by reference in its entirety.

TECHNICAL FIELD

The present invention relates to a determination device, a determination method, and a determination program for determining whether or not an attack has succeeded.

BACKGROUND ART

In related art, a technique for detecting an attack on a web server, or the like, has been proposed. However, if all attacks are detected and alerts are issued, a maintenance person or a monitoring person may overlook the alerts. It is therefore preferable to issue an alert only in a case where an attack has succeeded. Here, in related art, there is a technique of determining whether or not an attack has succeeded by inspecting a response when the attack is made on a web server, or the like (see Patent Literature 1).

CITATION LIST

Patent Literature

Patent Literature 1: Japanese Patent No. 6708794 B

SUMMARY OF INVENTION

Technical Problem

However, the related art is based on the premise that a trace of an attack appears in a response when the attack is made on a web server, or the like. Thus, for example, as will be described below, for an attack in which a trace of the attack does not explicitly appear in a response, it cannot be determined whether or not the attack has succeeded.

[Example 1: Case of Authentication Bypass] For example, it is assumed that a web application /login.php is vulnerable to SQL injection and the following attack is made.

GET /login.php?id=admin&pw=1' OR 1=1
    <html><title>Login successful! Welcome admin</title></html>

If this attack succeeds, an attacker can log in as an admin without knowing a password of an admin user. Even if this attack succeeds, a trace of the attack does not appear in content of a response.

[Example 2: Information Leakage] For example, it is assumed that a web application /show.php for displaying personal information is vulnerable to SQL injection, and the following attack is made.

GET /show.php?id=alice&pw=1' OR 1=1
    <html>
      <div>alice/tel: 12345678/alice@example.com </div>
      <div>admin/tel: 23456789/admin@example.com</div>
    </html>

If this attack succeeds, an attacker can not only browse only information on alice but also can browse information other than alice without knowing a password. Also in this attack, even if the attack succeeds, a trace of the attack does not appear in content of a response.

In addition, each of the above attacks is an attack against vulnerability of a function of the web application, and damage of the attack varies depending on the function of the web application, so that it is difficult to determine whether or not the attack has succeeded.

It is therefore an object of the present invention to solve the above-described problem and determine whether or not an attack has succeeded even in a case of an attack causing different damage in accordance with a function of a web application.

Solution to Problem

In order to solve the above problem, a determination device includes: processing circuitry configured to: detect a communication log of an attack causing different damage in accordance with a function of a web application of a request destination using a URL of the request destination in a communication log in which an attack is to be detected determine whether or not the attack has succeeded using whether or not there is a login form in the URL of the request destination, a response size to a request, or a status code, or any combination thereof, for the communication log in which the attack has been detected; and output a result of the determination.

Advantageous Effects of Invention

According to the present invention, it is possible to determine whether or not an attack has succeeded even in a case of an attack causing different damage in accordance with a function of a web application which is a target of the attack.

BRIEF DESCRIPTION OF DRAWINGS

FIG. 1 is a view for explaining operation outline of a determination device.

FIG. 3 is a view illustrating an example of a first communication log and a function profile in FIG. 2.

FIG. 4 is a view illustrating an example of detection data in FIG. 2.

FIG. 5 is a view illustrating an example of a result of success/failure determination of an attack by the determination device.

DESCRIPTION OF EMBODIMENTS

Figure 2:
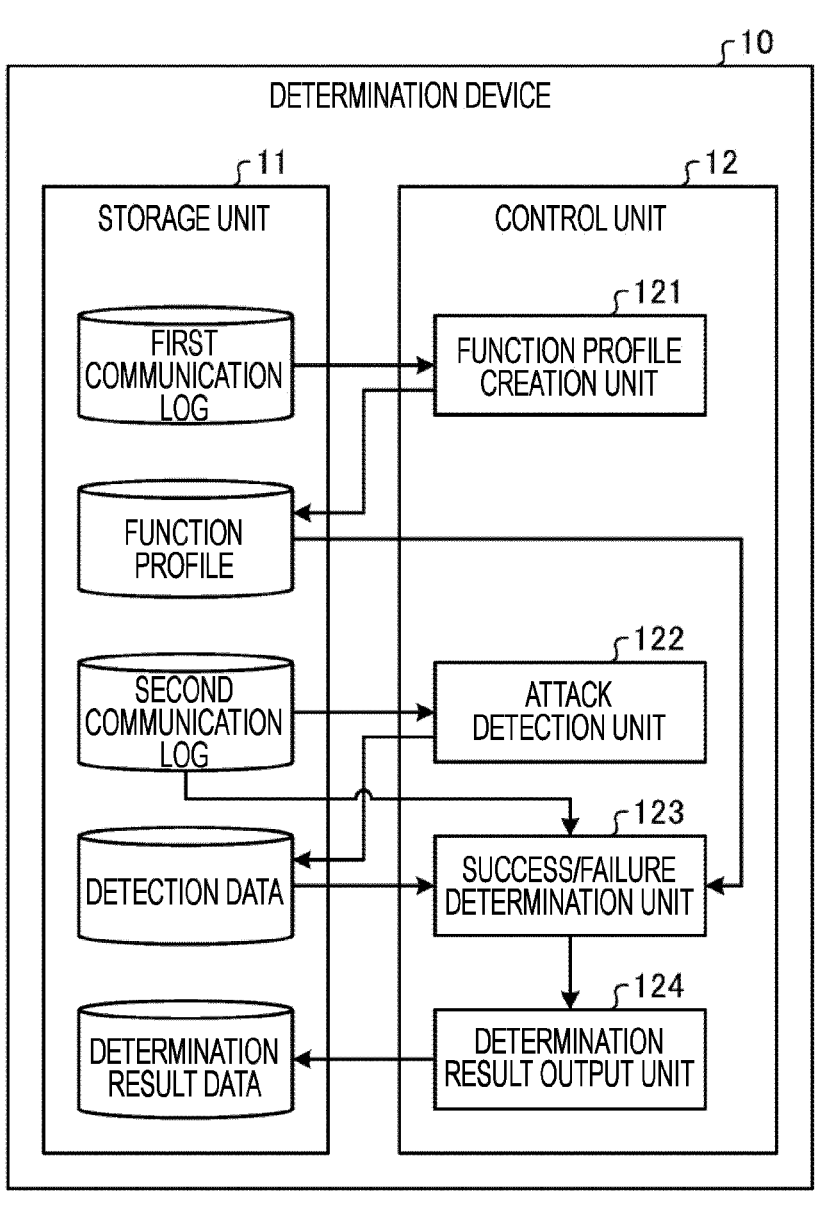
FIG. 2 is a view illustrating a configuration example of the determination device.

Hereinafter, modes for carrying out the present invention (embodiments) will be described with reference to the drawings. The present invention is not limited to the embodiments described below.

[Outline] First, outline of a determination device 10 according to the present embodiment will be described with reference to FIG. 1. For example, first, the determination device 10 acquires a communication log to a web server including a web application. Then, the determination device 10 detects an attack request of an attack causing different damage in accordance with a function of the web application from the communication log using an attack detection signature, or the like, prepared in advance. Thereafter, the determination device 10 determines whether or not the attack has succeeded using a status code, a response, and the like, of a response to the detected attack request.

Here, a case will be described as an example where the request to the web server is a request indicated by reference numerals 101 and 102, the status code for the request indicated by the reference numeral 101 is "302", and a response size for the request indicated by the reference numeral 102 is "10,000".

In this case, the determination device 10 specifies the request indicated by the reference numeral 101 as an authentication bypass attack using a detection signature (for example, "OR.*=.*#") of the attack causing different damage in accordance with the function of the web application and determines that the attack has succeeded from the status code ("302"). In addition, the determination device 10 specifies the request indicated by the reference numeral 102 as an information leakage attack using a detection signature of the attack causing different damage in accordance with the function of the web application and determines that the attack has succeeded from the response size ("10,000").

According to such a determination device 10, it is possible to determine whether or not an attack has succeeded even in a case of an attack causing different damage in accordance with the function of the web application which is a target of the attack.

[Configuration Example] Next, a configuration example of the determination device 10 will be described. The determination device 10 includes a storage unit 11 and a control unit 12. The storage unit 11 stores data to be referred to when the control unit 12 executes various kinds of processing and data generated by execution of various kinds of processing.

For example, the storage unit 11 stores a first communication log that is a communication log to be used to create a function profile, a second communication log that is a communication log in which an attack is to be detected, a function profile created by the control unit 12 (details will be described later), detection data (details will be described later), determination result data as to whether or not the attack has succeeded, and the like. For example, the first communication log and the second communication log are input through an input/output unit (not illustrated) of the determination device 10.

For example, as illustrated in FIG. 3, the first communication log includes a URL of a communication request destination, a status code for the request, a response size, content of the response, and the like. In addition, the second communication log also includes information similar to the above.

The control unit 12 controls the entire determination device 10. The control unit 12 includes a function profile creation unit 121, an attack detection unit 122, a success/failure determination unit 123, and a determination result output unit 124.

The function profile creation unit 121 creates profile information (function profile) indicating information such as whether or not there is a login form and a range of a response size for each function of the web application on the basis of a communication log of normal communication performed between an external device and the web application.

For example, the function profile creation unit 121 extracts a communication log of normal communication (communication other than an attack) from the first communication log illustrated in FIG. 3. For example, the function profile creation unit 121 acquires a communication log (No. 1, 2, 3) not detected as an attack by the attack detection unit 122 from the first communication log illustrated in FIG. 3.

Then, the function profile creation unit 121 creates a function profile indicating information such as whether or not there is a login form, the range of the response size, and number of a related request for each identification information (profile ID) of the function of the web application. The function profile creation unit 121 stores the created function profile in the storage unit 11.

For example, the function profile illustrated in FIG. 3 indicates that there is a login form in/login.php of the web application, and the range of the normal response size to a request for the function is [0, 100]. In addition, the function profile indicates that the related request is [1, 3].

Further, the function profile indicates that there is no login form in/show.php of the web application, and the range of the normal response size to a request for the function is [0, 100]. In addition, the function profile indicates that the related request is [2].

The description returns to FIG. 2. Using the URL of the request destination in the communication log indicated in the second communication log, the attack detection unit 122 detects a communication log of an attack causing different damage in accordance with the function of the web application of the request destination.

For example, in a case where a regular expression "OR.*=.*#" is set as an attack detection signature, the attack detection unit 122 detects a communication log in which an URL of the request destination includes "OR.*=.*#" among the communication logs indicated in the second communication log, as a communication log of an attack causing different damage in accordance with the function of the web application.

As an example, the attack detection unit 122 detects Nos. 4, 5, and 6 in the second communication log as an attack communication log using the regular expression "OR.*=.*#" as an attack detection signature (see FIG. 4). Then, the attack detection unit 122 stores information in which No (identification information) of the communication log in which the attack has been detected is associated with a target location (for example, a portion matching the attack detection signature in the URL of the request destination) in which the attack has been detected and content of the attack as detection data in the storage unit 11.

Note that the attack detection signature to be used by the attack detection unit 122 for attack detection may be a regular expression "OR (1|'t') (#|--)", a regular expression ".+['"] (#|--)", or the like.

The description returns to FIG. 2. For the communication log detected as the communication log of the attack by the attack detection unit 122, the success/failure determination unit 123 determines whether or not the attack has succeeded using whether or not there is a login form in the URL of the request destination, the response size, or the status code, or any combination thereof.

For example, the success/failure determination unit 123 determines whether or not the attack has succeeded by collating whether or not there is a login form in the URL of the request destination, the response size, and the function profile information (see FIG. 3) for the communication log detected as the communication log of the attack by the attack detection unit 122.

The success/failure determination unit 123 determines whether or not the attack has succeeded according to the following two conditions using, for example, the detection data and the function profile information (see FIG. 3).

(1) If there is a login form in the URL of the request destination of the communication log in which the attack has been detected, and the status code for the request is 30X (any one of 300 to 309) indicating successful login, the success/failure determination unit 123 determines that the authentication bypass attack has succeeded. Otherwise, the success/failure determination unit 123 determines that the attack has failed.

(2) In a case where there is no login form in the URL of the request destination of the communication log in which the attack has been detected, and the response size with respect to the request significantly exceeds a range of the normal response size, the success/failure determination unit 123 determines that the attack aiming at information leakage has succeeded. Otherwise, the success/failure determination unit 123 determines that the attack has failed.

Note that whether or not the response size significantly exceeds the range of the normal response size is determined, for example, by obtaining standard deviation σ of the response size and determining whether or not the response size in the communication log in which the attack has been detected exceeds n×σ. Note that n is a constant designated by a user of the determination device 10. For example, n=3σ.

For example, the communication log indicated in No. 4 of FIG. 5 is an attack against/login.php of the web application. Thus, the success/failure determination unit 123 confirms whether or not there is a login form in the URL of the request destination (attack destination) of the communication log on the basis of the function profile of /login.php of the web application (see FIG. 3). There is a login form in the URL of the request destination of the communication log, and thus, the success/failure determination unit 123 determines the communication log as an attack aiming at authentication bypass. Next, when the success/failure determination unit 123 looks at the status code of the communication log, it is 302. In other words, the number is 30X (any one of 300 to 309) indicating redirection (that is, the login has succeeded). Thus, the success/failure determination unit 123 determines that the attack aiming at the authentication bypass has succeeded.

The communication log indicated by No. 5 in FIG. 5 is also an attack against/login.php of the web application. Thus, the success/failure determination unit 123 confirms whether or not there is a login form in the URL of the request destination (attack destination) of the communication log on the basis of the function profile of /login.php of the web application (see FIG. 3). There is a login form in the URL of the request destination of the communication log, and thus, the success/failure determination unit 123 determines the communication log as an attack aiming at authentication bypass. Next, when the success/failure determination unit 123 looks at the status code of the communication log, it is 200. In other words, it is not 30X (any one of 300 to 309) indicating redirection (that is, the login has succeeded).

Thus, the success/failure determination unit 123 determines that the attack aiming at the authentication bypass has failed.

Furthermore, the communication log indicated in No. 6 of FIG. 5 is an attack against/show.php of the web application. Thus, the success/failure determination unit 123 confirms whether or not there is a login form in the URL of the request destination (attack destination) of the communication log on the basis of the function profile of /show.php of the web application (see FIG. 3). There is no login form in the URL of the request destination of the communication log, and thus, the success/failure determination unit 123 determines the communication log as an attack aiming at information leakage. Next, when the success/failure determination unit 123 looks at the response size of the communication log, it is 10,000. This response size significantly exceeds a normal response size range ([0, 100]) indicated in the function profile of /show.php of the web application. Thus, the success/failure determination unit 123 determines that the attack aiming at the information leakage has succeeded.

The description returns to FIG. 2. The determination result output unit 124 outputs a determination result by the success/failure determination unit 123. For example, the determination result output unit 124 outputs a determination result as to which attack has been performed on the function of which web application and whether or not the attack has succeeded. As an example, the determination result output unit 124 outputs whether an attack aiming at authentication bypass of /login.php of the web application has been made and whether or not the attack has succeeded, or whether an attack aiming at information leakage of/show.php of the web application has been made and whether or not the attack has succeeded. The determination result is stored in the storage unit 11, for example.

According to such a determination device 10, it is possible to determine whether or not the attack has succeeded even in a case where an attack causing different damage in accordance with the function of the web application which is the attack target is made.

Figure 6:
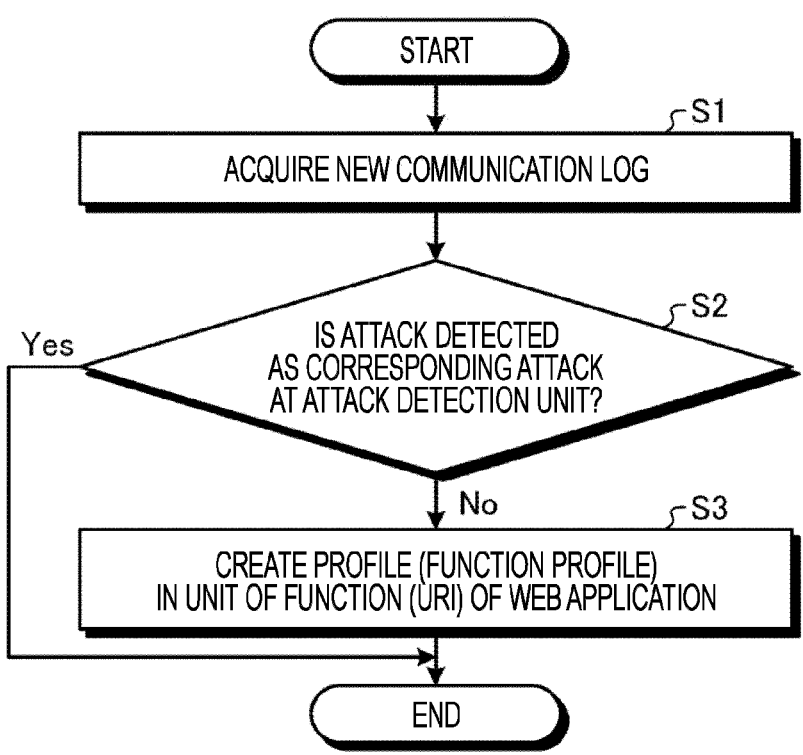
FIG. 6 is a flowchart illustrating an example of processing procedure in which the determination device creates a function profile.
Figure 7:
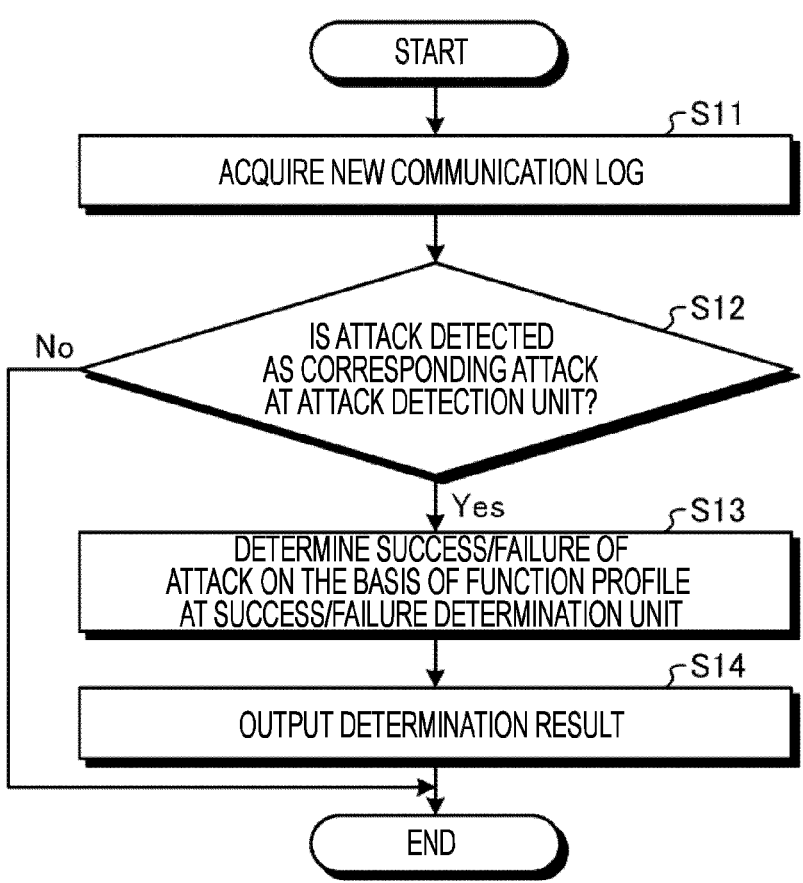
FIG. 7 is a flowchart illustrating an example of processing procedure when the determination device determines success/failure of an attack.

[Example of Processing Procedure] Next, with reference to FIGS. 6 and 7, an example of processing procedure of the determination device 10 will be described. First, an example of procedure in which the determination device 10 creates a function profile will be described with reference to FIG. 6.

When the determination device 10 acquires a new communication log (S1), the determination device 10 determines whether or not the communication log is detected by the attack detection unit 122 as a corresponding attack (attack causing different damage in accordance with the function of the web application) (S2).

Then, in a case where the communication log acquired in S1 is not detected by the attack detection unit 122 as the corresponding attack (attack causing different damage in accordance with the function of the web application) (No in S2), the function profile creation unit 121 creates a profile (function profile) for each function (URI) of the web application using the communication log (S3). Then, the function profile creation unit 121 stores the function profile created in S3 in the storage unit 11.

On the other hand, in a case where the communication log acquired in S1 is detected as the corresponding attack (attack causing different damage in accordance with the function of the web application) by the attack detection unit 122 (Yes in S2), the function profile creation unit 121 ends the processing without performing processing of creating a function profile using the communication log.

Next, an example of procedure in which the determination device 10 determines whether or not the attack has succeeded using the function profile will be described with reference to FIG. 7.

First, when the determination device 10 acquires a new communication log (S11), the attack detection unit 122 determines whether or not the communication log is detected as a corresponding attack (attack causing different damage in accordance with the function of the web application) (S12). In a case where the communication log is detected by the attack detection unit 122 as the corresponding attack (attack causing different damage in accordance with the function of the web application) (Yes in S12), the success/failure determination unit 123 determines whether the attack has succeeded or has failed on the basis of the function profile (S13). Then, the determination result output unit 124 outputs the determination result in S13 (S14). On the other hand, in a case where the communication log is not detected as the corresponding attack (attack causing different damage in accordance with the function of the web application) by the attack detection unit 122 (No in S12), the processing ends.

By performing the above processing by the determination device 10, it is possible to determine whether or not the attack has succeeded even in a case of an attack causing different damage in accordance with the function of the web application which is the attack target. As a result, a maintenance person or an administrator can separate an alert to be prioritized and an alert not to be prioritized with respect to the attack described above, and thus, can efficiently perform the security operation.

[Other Embodiments] Note that the attack detection unit 122 in the determination device 10 may be provided outside the determination device 10. For example, as illustrated in (1) and (2) of FIG. 8, the attack detection unit 122 may be implemented by an attack detection device such as a web application firewall (WAF) provided outside the determination device 10. Furthermore, as illustrated in (1) of FIG. 8, the determination device 10 may have a configuration (inline configuration) in which the determination device 10 is directly connected to a web server for which it is to be determined whether or not an attack has succeeded, or as illustrated in (2) of FIG. 8, may have a configuration (tap configuration) in which the determination device 10 is connected to the web server via an attack detection device such as a WAF.

[System Configuration and Others] Each component of each unit illustrated in the drawings is functionally conceptual and does not necessarily need to be physically configured as illustrated in the drawings. In other words, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program to be executed by the CPU or can be implemented as hardware by wired logic.

In the processing described in the above embodiment, all or part of processing described as being automatically performed may be manually performed, or all or part of processing described as being manually performed may be automatically performed by a known method. In addition, the processing procedure, the control procedure, the specific names, and the information including various types of data and parameters illustrated in the above document and the drawings can be freely changed unless otherwise specified.

[Program] The determination device 10 described above can be implemented by installing a program in a desired computer as package software or online software. For example, by causing an information processing device to perform the above-described program, the information processing device can be caused to function as the determination device 10. The information processing device mentioned here includes a desktop or a laptop personal computer. In addition, the information processing device also includes mobile communication terminals such as a smartphone, a mobile phone, and a personal handy-phone system (PHS) and terminals such as a personal digital assistant (PDA).

In a case where a terminal device to be used by a user may be implemented as a client, the determination device 10 may also be implemented as a server device that provides a service related to the above-described processing to the client. In this case, the server device may be implemented as a web server or may be implemented as a cloud that provides a service regarding the above-described processing by outsourcing.

Figure 8:
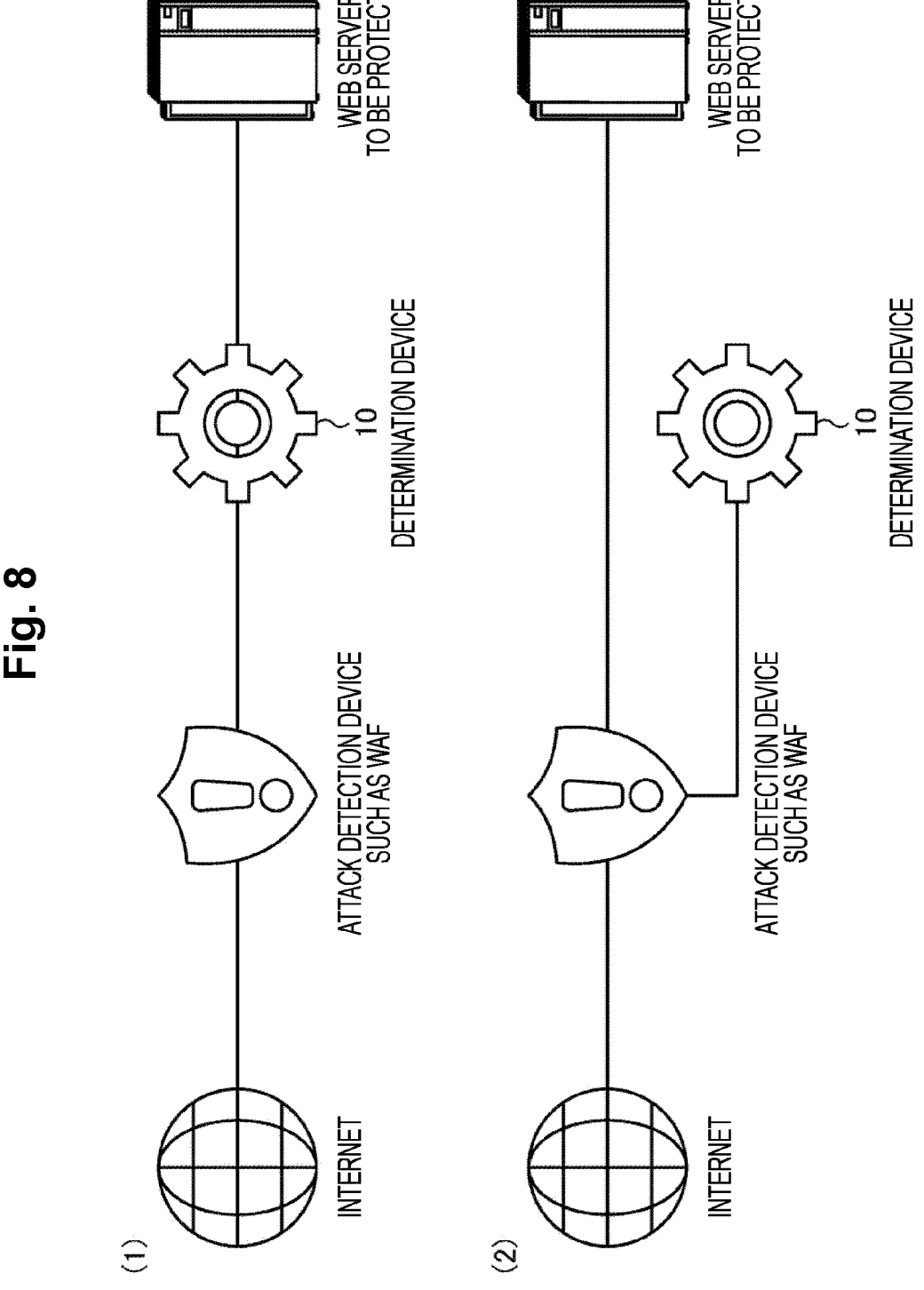
FIG. 8 is a view illustrating a configuration example of a system including the determination device.
Figure 9:
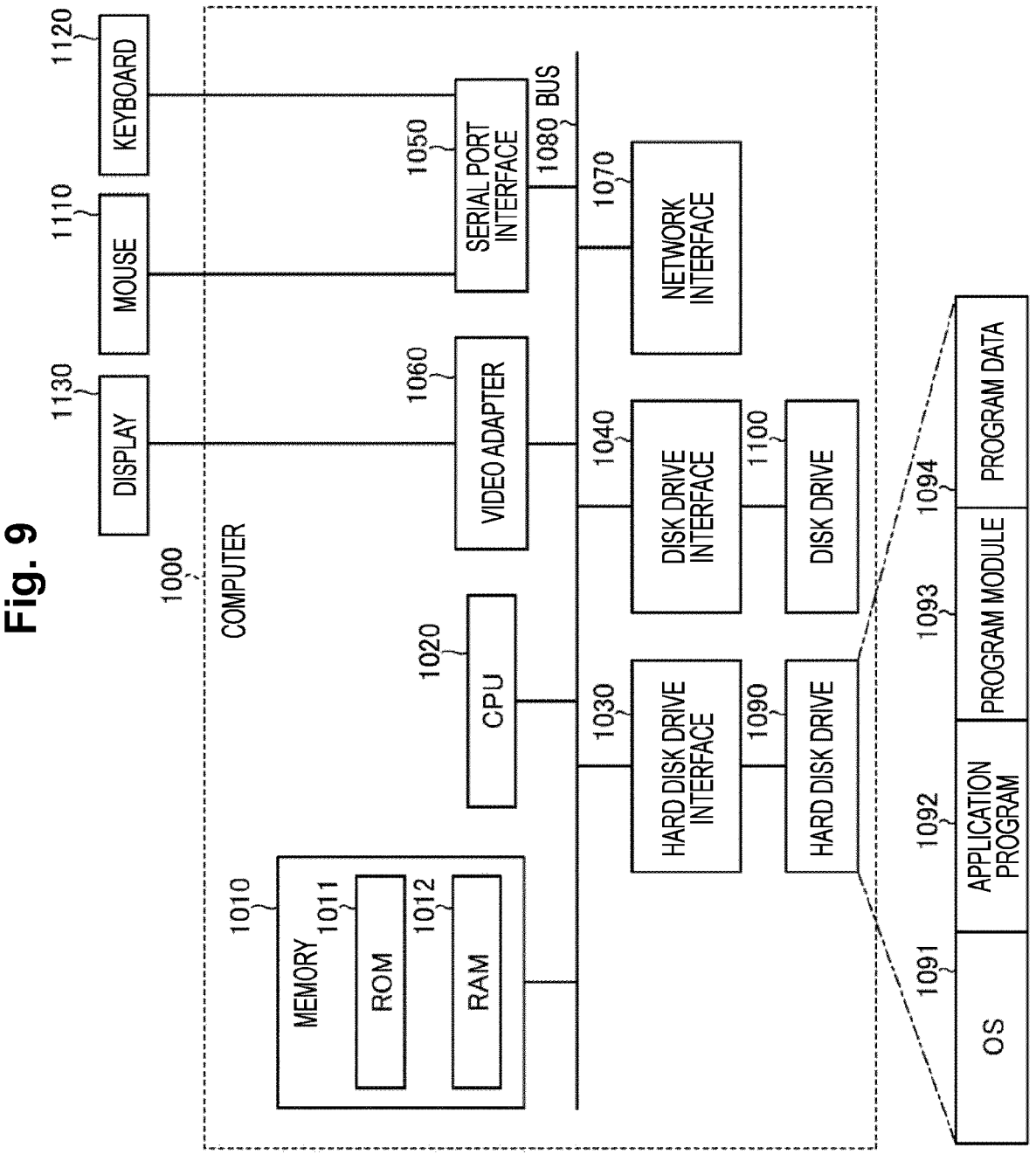
FIG. 9 is a view illustrating a configuration example of a computer that executes a determination program.

FIG. 8 is a view illustrating an example of a computer that executes a determination program. A computer 1000 includes, for example, a memory 1010 and a CPU 1020. In addition, the computer 1000 further includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk and an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, a program that defines each kind of processing to be executed by the determination device 10 is implemented as the program module 1093 in which codes executable by the computer are described. The program module 1093 is stored in, for example, the hard disk drive 1090. For example, the program module 1093 executing similar processing to the functional configurations in the determination device 10 is stored in the hard disk drive 1090. Note that the hard disk drive 1090 may be replaced with a solid state drive (SSD).

Data to be used in the processing of the above embodiments is stored in, for example, the memory 1010 or the hard disk drive 1090 as the program data 1094. In addition, the CPU 1020 reads the program module 1093 and the program data 1094 stored in the memory 1010 and the hard disk drive 1090 into the RAM 1012 as necessary and executes the program module 1093.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

<div align="center">REFERENCE SIGNS LIST</div>

10 Determination device
11 Storage unit
12 Control unit
121 Function profile creation unit
122 Attack detection unit
123 Success/failure determination unit
124 Determination result output unit

The invention claimed is:

1. A determination device comprising:
processing circuitry configured to:
detect, based on a Universal Resource Locator ("URL") of a request destination of a request in a communication log that has captured a network communication of a web application, the communication log that indicates an attack on the web application, wherein the attack has caused a distinct damage in accordance with a function of the web application of the request destination;
determine, by using the detected communication log, a result of the attack, wherein the result of the attack is based on:
whether the URL of the request destination of the request in the detected communication log indicating a login form and at least either one of a response size in a response to the request or a status code in the response, and
determining whether or not the attack has succeeded as the result of the attack by collating:
whether or not there is the login form in the URL of the request destination in the request against profile information of the function of the web application indicating whether or not the function of the web application has a login form, and
the response size in the response to the request in which the attack has been detected against a range of a response size when the response is returned to an external device; and
output a result of the determination.

2. The determination device according to claim 1, wherein the processing circuitry is further configured to detect
the communication log of the attack causing different damage in accordance with the function of the web application of the request destination using a regular expression "OR.*=.* #", a regular expression "OR (1|'t') (#|--)", or a regular expression ".+['"] (#|--)", or any combination thereof as an attack detection signature.

3. The determination device according to claim 1, wherein the processing circuitry is further configured to create profile information of the function of the web application based on normal communication performed between the external device and the function of the web application.

4. The determination device according to claim 1, wherein the processing circuitry is further configured to determine
in a case where it is determined for the communication log in which the attack has been detected that there is a login form in the URL of the request destination and the status code is one of 300 to 309, that an attack aiming at authentication bypass has succeeded.

5. The determination device according to claim 1, wherein the processing circuitry is further configured to determine
in a case where it is determined for the communication log in which the attack has been detected that there is no login form in the URL of the request destination and a response size to the request exceeds a range of a response size indicated in profile information of the function of the web application by equal to or greater than a predetermined value, that an attack aiming at information leakage has succeeded.

6. A determination method executed by a determination device, the determination method comprising:
detecting, based on a Universal Resource Locator ("URL") of a request destination of a request in a communication log that has captured a network communication of a web application, the communication log that indicates an attack on the web application, wherein the attack has caused a distinct damage in accordance with a function of the web application of the request destination;
determining, by using the detected communication log, a result of the attack, wherein the result of the attack is based on:
whether the URL of the request destination of the request in the detected communication log indicating a login form and at least either one of a response size in a response to the request or a status code in the response, and
determining whether or not the attack has succeeded as the result of the attack by collating:
whether or not there is the login form in the URL of the request destination in the request against profile information of the function of the web application indicating whether or not the function of the web application has a login form, and
the response size in the response to the request in which the attack has been detected against a range of a response size when the response is returned to an external device; and
outputting a result of the determination.

7. A non-transitory computer-readable recording medium storing therein a determination program that causes a computer to execute a process comprising:
detecting, based on a Universal Resource Locator ("URL") of a request destination of a request in a communication log that has captured a network communication of a web application, the communication log that indicates an attack on the web application, wherein the attack has caused a distinct damage in accordance with a function of the web application of the request destination;
determining, by using the detected communication log, a result of the attack, wherein the result of the attack is based on:
whether the URL of the request destination of the request in the detected communication log indicating a login form and at least either one of a response size in a response to the request or a status code in the response, and
determining whether or not the attack has succeeded as the result of the attack by collating:
whether or not there is the login form in the URL of the request destination in the request against profile information of the function of the web application indicating whether or not the function of the web application has a login form, and the response size in the response to the request in which the attack has been detected against a range of a response size when the response is returned to an external device; and outputting a result of the determination.

\* \* \* \* \*